F. A. DONALDSON.
AIR CLEANER.
APPLICATION FILED MAR. 10, 1921.
1,405,399.
Patented Feb. 7, 1922.
2 SHEETS—SHEET 2.
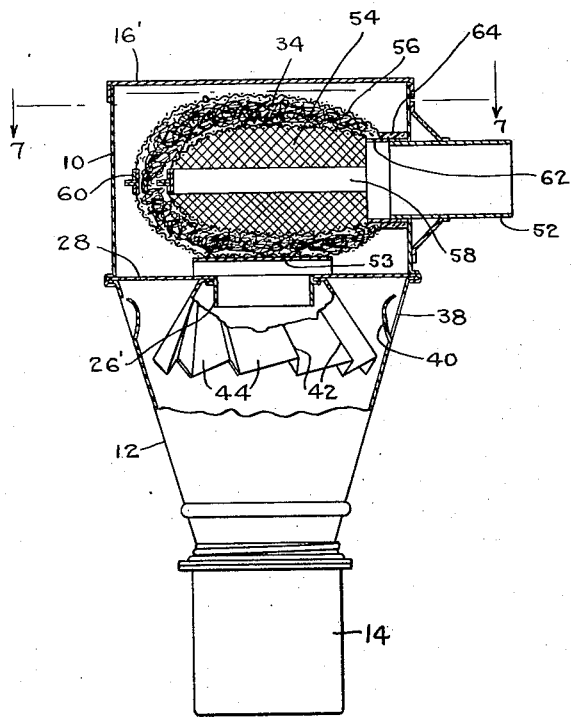
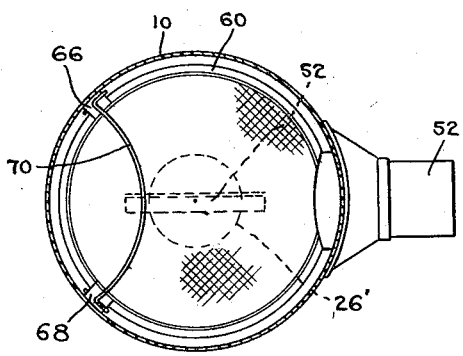
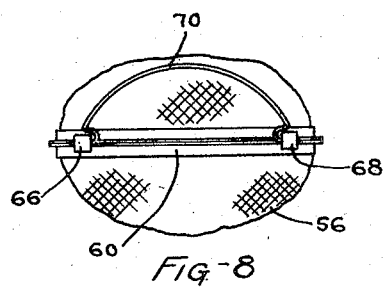
INVENTOR:
FRANK A. DONALDSON.
BY Whiteley and Ruckman
ATTORNEYS.

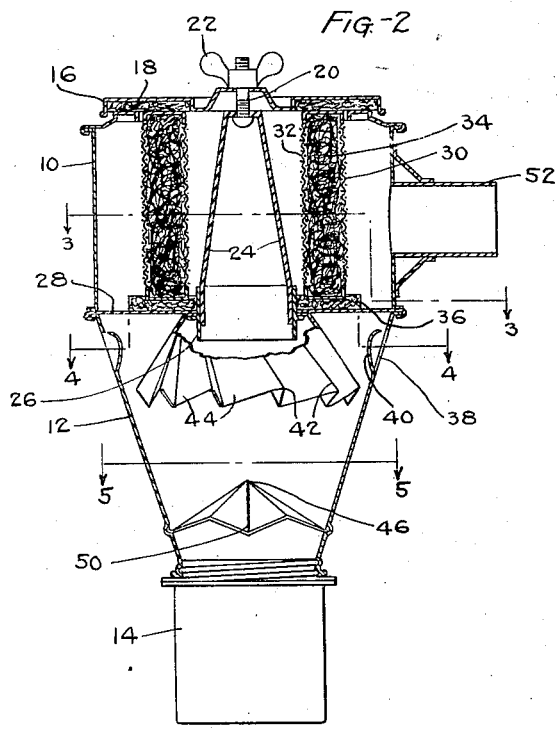

UNITED STATES PATENT OFFICE.

FRANK A. DONALDSON, OF MINNEAPOLIS, MINNESOTA.

AIR CLEANER.

1,405,399.   Specification of Letters Patent.   Patented Feb. 7, 1922.

Application filed March 10, 1921. Serial No. 451,172.

*To all whom it may concern:*

Be it known that I, FRANK A. DONALDSON, a citizen of the United States, residing at Minneapolis, in the county of Hennepin and State of Minnesota, have invented certain new and useful Improvements in Air Cleaners, of which the following is a specification.

My invention relates to air cleaners, and while intended more particularly for use in connection with carbureters of internal combustion engines, my device may be used as an air cleaner of general utility. Heretofore air cleaners which have been in use included two general types operating either upon the gravity principle or the filtering principle. Gravity cleaners remove a large percentage of the dust including the heavier particles but they do not remove the last traces of the fine dust. On the other hand, filtration cleaners effectively remove the dust, fine particles as well as coarse ones, but in practice when a filtering device is used to remove all of the dust, it soon clogs up and unduly restricts the passage of air thus requiring very frequent cleaning if sufficient passage of air is to be maintained. I have discovered that an extremely efficient air cleaner is produced by combining these two types of cleaners in such manner that most of the dust is first taken out by gravity separation, the nearly cleaned air then passing through a filtering member which removes the remaining fine dust carried by the air. By constructing my cleaner in this manner, it may be operated for a considerably period of time before the dust accumulates in the filtering member to an extent sufficient to unduly restrict the passage of air therethrough. The special object, therefore, of my invention is to provide an air cleaner which will remove substantially all of the dust including fine particles from air without the device becoming choked and rendered ineffective.

The full objects and advantages of my invention will appear in connection with the detailed description, and the novel features embodied in my inventive idea will be particularly pointed out in the claims.

Referring to the drawings which illustrate the application of my invention,—

Fig. 1 is an elevational view of my device. Fig. 2 is a view mostly in central vertical section. Fig. 3 is a view in horizontal section on the line 3—3 of Fig. 2. Fig. 4 is a view in horizontal section on the line 4—4 of Fig. 2. Fig. 5 is a view in horizontal section on the line 5—5 of Fig. 2. Fig. 6 is a view mostly in central vertical section of a modified construction. Fig. 7 is a view in horizontal section on the line 7—7 of Fig. 6. Fig. 8 is an end view of the filtering member shown in Fig. 6.

As illustrated in the drawings, my air cleaner is contained in a casing having an upper cylindrical portion 10 and a lower truncated conical portion 12, the smaller end of which is at the bottom and is adapted to receive a container or collecter 14 for the dust removed by gravity separation. The upper end of the casing member 10 is closed by a cap 16, the under side of which is provided with an annular recess for receiving a washer 18 of felt or other suitable material. The cap 16 is held in place by a bolt 20 which on the upper side of the cap is provided with a wing nut 22. The headed end of this bolt passes through the middle portion of a U-shape strap 24, the arms of which at their lower ends are secured to a spout 26 carried by annular partition 28 just outside of the spout separating the space within the cylindrical casing from the space within the conical casing. Outside of the strap 24 in the upper chamber is an annular filtering member consisting of two concentrical wire screen cylinders 30 and 32, the space between which is filled with suitable filtering material 34, such as curled hair impregnated with oil. This filtering member is placed between the washer 18 and a washer 36 positioned on the upper surface of the partition 28. The conical casing 12 near its junction with the cylindrical casing 10 is provided with a plurality of air inlet openings 38 arranged around the periphery. Portions of the casing are partly cut out to form these openings, and these partly cut-out portions are bent inwardly at their free ends to form air guides 40. Attached to the spout 26 and depending therefrom is an outwardly flaring distributing member of sheet metal which is shaped in dies to form a plurality of ridges 42 separated by intervening depressions or pockets 44. The air inlet openings 38 are concentrically spaced outside of these ridges and depressions, and the air which enters the openings 38 is first given a rotary movement by the guides 40 and then is directed downwardly and distributed by the ridges and intervening pockets which are on the distributing member. Supported within the lower portions of the casing 12 is a baffle plate 46 which, as shown in Fig. 5, is square in outline and has its four corners resting on the casing so that the openings 48 are provided between the baffle and the inner surface of the casing. This baffle is bent upwardly from the edges to the center so that troughlike depressions 50 are formed down which the dust gravitates to the openings 48 leading into the receptacle 14. This dust receptacle may be formed of glass in order that the amount of dust collected may be seen at a glance, and, as shown, this receptacle is threaded at its upper end to engage threads on the lower end of the casing 12 and thus forms an air-tight closure for the bottom of the casing. The casing 10 is provided with an outlet pipe 52 which may be connected with the intake of a carbureter or with any other suitable suction device. It is obvious that my combined cleaning principle may be employed in air cleaners in general.

The modified construction shown in Figs. 6, 7 and 8 is similar to that already described except in regard to the filtering member, and so far as applicable the same reference numerals will be employed. The spout 26' instead of extending into the upper chamber terminates flush with the annular partition 28 and a strip 53 is secured to the partition 28 so as to be spaced above the central opening therein. In place of the cylindrical filtering member previously described, a baglike filtering member is employed consisting of inner and outer wire screens 54 and 56, the space between which is filled with filtering material 34 such as that already described. The screens are held in extended position by an inner curved strip 58 and an outer curved strip 60, the free ends of these strips being attached to a ring or neck member 62 upon which is a section of hose or rubber tubing 64 by means of which the neck 62 may be connected with the inner end of the outlet pipe 52 with a tight joint. The strip 60 is provided with two ears 66 and 68 which serve to space the filtering member from the casing 10 and also serve for attaching the ends of a bail 70 by means of which the filtering member may be pulled out of the casing for cleaning when the cover 16' is removed. In this form of filtering member, the air to be filtered passes therethrough from the outside to the inside instead of from the inside to the outside as in the form previously described.

The operation and advantages of my invention will be readily understood from the above description. The air which is drawn in through the ports 38 is given a rotary movement by the inclined guides 40 and this, in connection with the outwardly inclined channels or pockets 44, cause most of the dust which enters with the air to be thrown against the inner surface of the casing 12 and to gravitate through the openings 48 into the receptacle 14. The air which is thus freed from a large portion of the dust passes to the center of the casing and within the distributing member. This air carries only fine dust which is but a small percentage of the original amount of dust contained in the air which entered. This fine dust is caught by the filtering material 34 during the passage of the air therethrough, on its way to the outlet pipe 52. Since the surface of the filtering member is relatively large, a considerable quantity of dust may be trapped before there is any objectionable restriction to the flow of air passing to the outlet pipe 52. Upon removing the nut 22, the filtering member may be readily removed for cleaning and then replaced.

I claim—

1. An air cleaner comprising a single casing member forming the outer wall of two superposed chambers with an opening extending centrally from one chamber into the other, means for admitting air directly through said wall into the first only of said chambers, means in said chamber for causing the admitted air to move centrifugally therein, air-outlet means connected with the second of said chambers, and a hollow filtering member removably held in the second chamber and being everywhere materially spaced from said casing wall and dividing the second chamber into two portions, one of which is in communication with the first chamber and the other of which is in communication with the air outlet means.

2. An air cleaner comprising a single casing member forming the outer wall of two superposed chambers with an opening extending centrally from one chamber into the other, means for admitting air directly through said wall into the first only of said chambers, means in said chamber for causing the admitted air to move centrifugally therein, air-outlet means connected with the second of said chambers, a hollow filtering member removably held in the second chamber and being everywhere materially spaced from said casing wall and dividing the second chamber into two portions, one of which is in communication with the first chamber and the other of which is in communication with the air outlet means, and a cover adapted to close the second chamber and lock the filter in position, said cover provided with means for ready removal to permit the filter to be taken out and cleaned.

3. An air cleaner comprising a single casing member forming two superposed chambers with an opening extending centrally from one chamber into the other, a multiplicity of openings through the casing for admitting air directly into one of said chambers, means in the last-mentioned chamber for acting upon the admitted air to cause it to move centrifugally in said last-named chamber, air-outlet means connected with the other of said chambers, and a filtering member located in the second chamber and being everywhere materially spaced from the casing wall thereof and dividing the second chamber into two portions, one of which is in communication with the first-named chamber and the other of which is in communication with the air-outlet means.

4. An air cleaner comprising a single casing member forming the outer walls of two superposed chambers with an opening extending centrally from one chamber into the other, the second of said chambers being cylindrical in cross-section and having air-outlet means extending through the cylindrical wall, means for admitting air directly through the casing into the first chamber, means in the first chamber for acting upon the admitted air to cause it to move centrifugally therein, and a thimble-shaped filter in the second chamber extending from the bottom to the top thereof and spaced from said cylindrical wall so as to form a cylindrical passageway in communication with the first chamber and an annular passageway in communication with the air-outlet means.

5. An air cleaner comprising a single casing member, an annular partition provided with a central opening separating the space in said casing into two chambers, means for admitting air directly through the casing into and directing it centrifugally within the first chamber, a thimble-shaped filtering member in the second chamber resting upon the annular partition and surrounding the central opening therethrough, an imperforate cover closing the second chamber and holding the filtering member removably in the chamber, and an outlet pipe having connection with the second chamber.

6. An air cleaner comprising a casing, means between the top and bottom of said casing for admitting air centrifugally, a hollow outwardly flaring imperforate distributing member spaced inwardly from said air admitting means, said member having a series of ridges inclined outwardly in the direction of whirl of the incoming air, means for closing the bottom of said casing, a hollow filtering member above said air admitting means and spaced inwardly from the wall of said casing, and an outlet pipe for receiving the air passing through said hollow filtering member.

7. An air cleaner comprising a casing, means between the top and bottom of said casing for admitting air centrifugally, means for closing the bottom of said casing, an annular partition above said air admitting means separating the space in said casing into two chambers with a central passage between the same, a downwardly extended spout attached to the inner margin of said annular partition, a hollow outwardly flaring imperforate distributing member surrounding and extending below said spout, said distributing member being spaced inwardly from said air admitting means and having a series of ridges inclined outwardly in the direction of whirl of the incoming air, a hollow filtering member in the upper chamber and spaced inward from the wall thereof, and an outlet pipe for receiving the air passing through said hollow filtering member.

In testimony whereof I hereunto affix my signature.

FRANK A. DONALDSON.